United States Patent
Ishida

[11] Patent Number: 6,087,798
[45] Date of Patent: Jul. 11, 2000

[54] SEMICONDUCTOR INTEGRATED CIRCUIT DEVICE AND DISK DRIVE APPARATUS

[75] Inventor: Takuya Ishida, Kyoto, Japan

[73] Assignee: Rohm Co., Ltd., Kyoto, Japan

[21] Appl. No.: 09/260,491

[22] Filed: Mar. 2, 1999

[30] Foreign Application Priority Data

Mar. 2, 1998 [JP] Japan ................................ 10-049226
Mar. 3, 1998 [JP] Japan ................................ 10-050813

[51] Int. Cl.[7] ........................................................ H02P 8/00
[52] U.S. Cl. .......................... 318/696; 318/560; 318/561; 318/565; 318/434; 388/909; 388/934; 395/109
[58] Field of Search .................................... 318/696, 560, 318/561, 565, 434; 388/909, 934; 360/78.04; 395/109

[56] References Cited

U.S. PATENT DOCUMENTS

5,588,092  12/1996  Komiya et al. ........................ 395/109
5,594,603   1/1997  Komiya et al. ........................ 318/560

*Primary Examiner*—Karen Masih
*Attorney, Agent, or Firm*—Arent Fox Kintner Plotkin & Kahn, PLLC

[57] ABSTRACT

A semiconductor integrated circuit device for use in a disk drive apparatus has a stepping motor driver for feeding an electric current to a stepping motor, a temperature monitoring circuit for monitoring the temperature due to the heat generated by the stepping motor driver, a signal processing circuit for processing an analog signal communicated to write or read data to or from a magnetic data recording medium, and a controller for controlling the stepping motor driver and the signal processing circuit. The signal processing circuit is arranged between the stepping motor driver and the temperature monitoring circuit. This minimizes the variation of the ground level of the temperature monitoring circuit that occurs every time the stepping motor driver is turned on or off and thereby makes accurate monitoring of the temperature possible.

11 Claims, 6 Drawing Sheets

SEMICONDUCTOR INTEGRATED CIRCUIT DEVICE AND DISK DRIVE APPARATUS

BACKGROUND OF THE INVENTION

1. Field of the Invention

The present invention relates to a disk drive apparatus, and to a semiconductor integrated circuit device for use in a disk drive apparatus.

2. Description of the Prior Art

Figure 1:
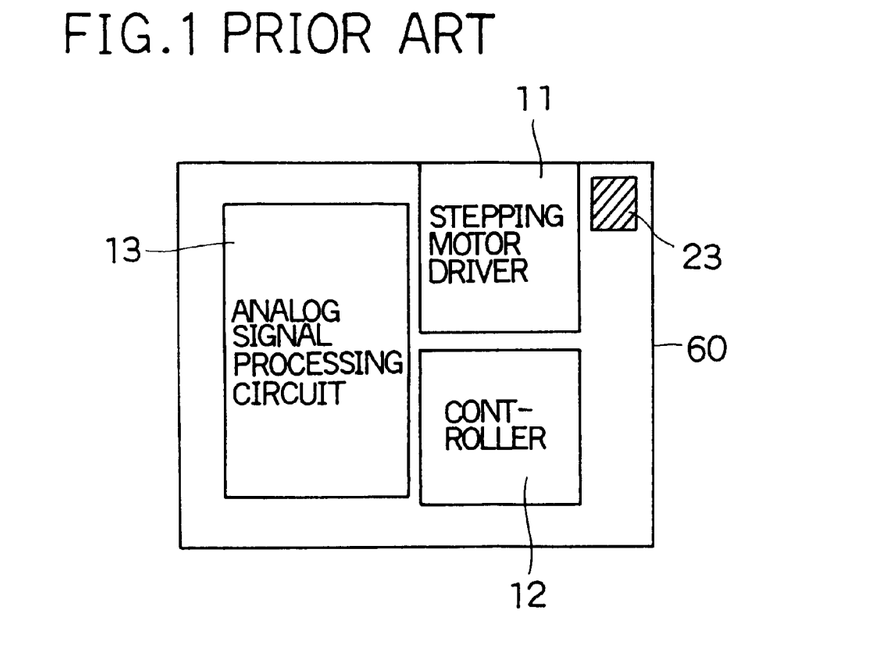
FIG. 1 is a diagram showing the arrangement of various circuits in a conventional semiconductor integrated circuit device designed for use in a disk drive apparatus.

A conventional disk drive apparatus will be described. FIG. 1 shows the arrangement of various circuits in an LSI (large-scale integrated circuit) 60 designed for use in a floppy disk drive apparatus taken as an example of a conventional disk drive apparatus. The LSI 60 includes a stepping motor driver 11, an analog signal processing circuit 13, a controller 12, and a thermal shutdown circuit 23.

The stepping motor driver 11, by its on/off operation, feeds an electric current to a stepping motor (not shown) to drive it. The stepping motor serves to transport a read/write head (not shown) to a specified track position.

The analog signal processing circuit 13 processes analog signals that are communicated to write and read data to and from a floppy disk, which is a type of magnetic data recording medium. The controller 12 interfaces with a personal computer (not shown) serving as a host, and also controls the stepping motor driver 11 and the analog signal processing circuit 13.

The thermal shutdown circuit 23 incorporates a temperature monitoring circuit, with which it monitors the temperature of the LSI 60. As the stepping motor driver 11 operates, the LSI 60 generates heat. If the LSI 60 generates so much heat that its temperature rises above a predetermined temperature, the thermal shutdown circuit 23 forcibly turns off the stepping motor driver 11. Thus, the thermal shutdown circuit 23 serves to prevent malfunctioning of the LSI 60 due to high temperature resulting from abnormal heat generation and simultaneously protect the LSI 60 from abnormal heat generation.

Figure 2:
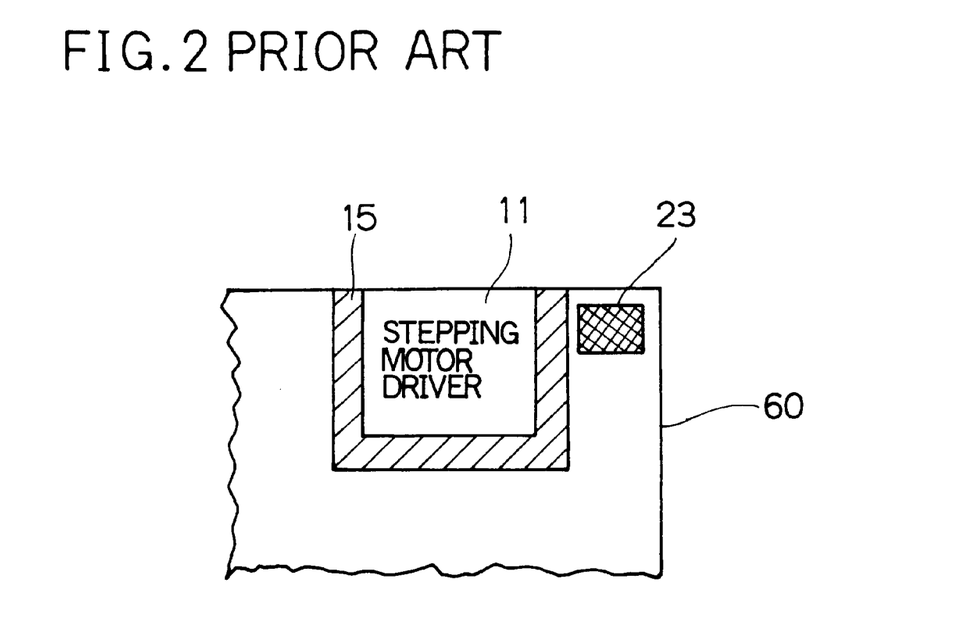
FIG. 2 is a diagram showing the positional relationship between the stepping motor driver and the thermal shutdown circuit in the conventional semiconductor integrated circuit device shown in FIG. 1.

FIG. 2 shows a part of the LSI 60. The thermal shutdown circuit 23 outputs a voltage that represents the monitored temperature. When this voltage rises above a threshold voltage, the thermal shutdown circuit 23 turns off the stepping motor driver 11.

Figure 3:
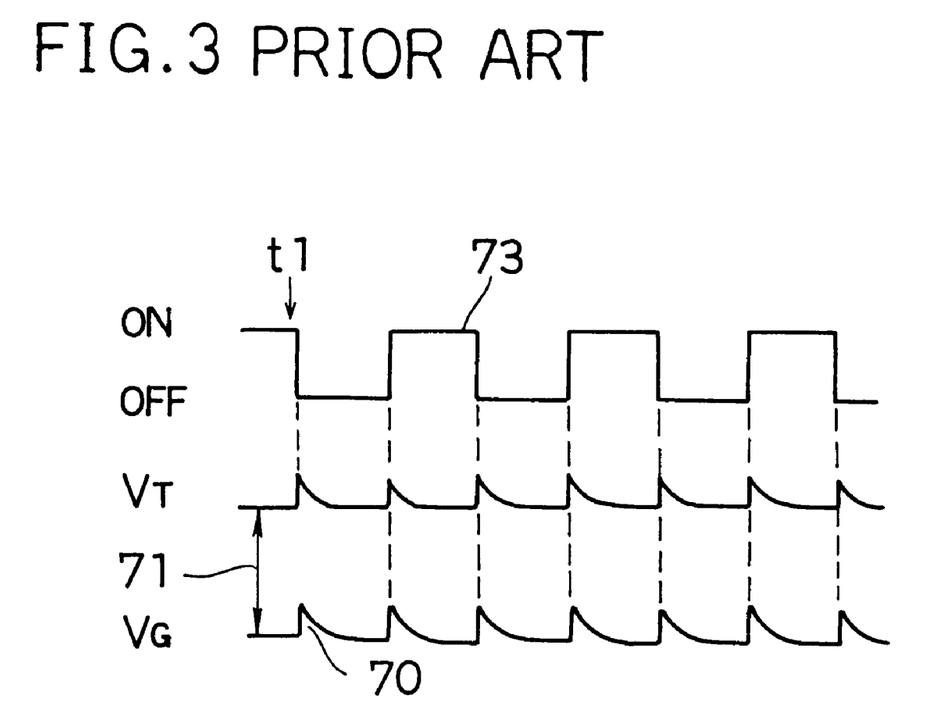
FIG. 3 is a waveform diagram illustrating the operation of the conventional semiconductor integrated circuit device shown in FIG. 1.

Conventionally, as shown in FIG. 2, the stepping motor driver 11 and the thermal shutdown circuit 23 are arranged close to each other. As a result, as shown in FIG. 3, every time the stepping motor driver 11 is turned on or off as indicated by the waveform 73, a back electromotive force appears in the coil of the stepping motor (not shown) connected to the LSI 60, and this back electromotive force causes a current to flow through the IC substrate into the ground pattern of the stepping motor driver 11, the stepping motor driver 11 pulling the current in from its ground pattern. Consequently, the ground level VG around the stepping motor driver 11 suffers noise of about 0.1 V. In the temperature monitoring circuit, a constant current is made to flow through a resistor to use the voltage appearing across the resistor as a reference voltage VT, and this reference voltage VT is applied to the base of a transistor. As the temperature rises, the threshold voltage VF of the transistor drops; when the temperature becomes so high that VT exceeds VF, the transistor is turned on, and thereby indicates that the temperature has reached the predetermined temperature.

For example, as shown in FIG. 3, when, at a time point t1, the stepping motor driver 11 is turned from on to off, the ground level VG suffers noise 70. Since the reference voltage VT equals the voltage across the resistor (indicated by the waveform 71 in FIG. 3) added to the ground level VG, the noise 70 acts to shift up the reference voltage VT. This makes the temperature monitoring by the temperature monitoring circuit accordingly less accurate, and thus degrades the accuracy with which the thermal shutdown circuit 23 monitors the temperature.

To solve this problem, as shown in FIG. 2, in the conventional LSI 60, it is customary to minimize the effect of the noise by securing an inhibited region 15, about 200 $\mu$m wide, around the stepping motor driver 11 and arranging the thermal shutdown circuit 23 outside the inhibited region 15. However, securing an inhibited region 15 in an LSI 60 inconveniently requires a larger chip area.

SUMMARY OF THE INVENTION

An object of the present invention is to provide a semiconductor integrated circuit device for use in a disk drive apparatus that allows its temperature to be monitored accurately by a thermal shutdown circuit or the like.

Another object of the present invention is to provide a semiconductor integrated circuit device for use in a disk drive apparatus that has a thermal shutdown circuit designed to be less susceptible to noise resulting from a back electromotive force appearing in a motor and that requires an accordingly smaller chip area.

To achieve the above objects, according to one aspect of the present invention, a semiconductor integrated circuit device is provided with: a stepping motor driver for feeding an electric current to a stepping motor; a temperature monitoring circuit for monitoring the temperature due to the heat generated by the stepping motor driver; a signal processing circuit for processing an analog signal communicated to write or read data to or from a magnetic data recording medium; and a controller for controlling the stepping motor driver and the signal processing circuit. Here, the signal processing circuit is arranged between the stepping motor driver and the temperature monitoring circuit.

In this semiconductor integrated circuit device, the temperature monitoring circuit is arranged far away from the stepping motor driver, with the signal processing circuit arranged between them. In addition, the temperature monitoring circuit and the signal processing circuit use a ground pattern separate from that for the stepping motor driver. This almost eliminates the effect of, for example, the on/off operation of the stepping motor driver on the ground level or the like of the temperature monitoring circuit. In a disk drive apparatus, the stepping motor driver drives a stepping motor. When the stepping motor driver is operating, reading or writing of data is not performed, and therefore the signal processing circuit remains inactive. Accordingly, even though the signal processing circuit is arranged next to the stepping motor driver, the former is not affected by the noise generated by the on/off operation of the latter.

According to another aspect of the present invention, a semiconductor integrated circuit device is provided with: a stepping motor driver for feeding an electric current to a stepping motor; a temperature monitoring circuit having a circuit that continuously monitors temperature; a signal processing circuit for processing an analog signal communicated to write or read data to or from a magnetic data recording medium; and a controller for controlling the stepping motor driver and the signal processing circuit. Here, the temperature monitoring circuit has a latch circuit that latches the output of the temperature monitoring circuit out of synchronism with the turning on or off of the stepping motor driver.

In this semiconductor integrated circuit device, the temperature monitoring circuit has a latch circuit. The signal output from the circuit that continuously monitors temperature is susceptible to the noise caused by a back electromotive force appearing in the coil of the stepping motor connected to the semiconductor integrated circuit device every time the stepping motor drive is turned on or off. However, the latch circuit performs its latching operation out of synchronism with the on/off operation of the stepping motor driver. That is, the latch circuit is so configured as not to take in the signal fed thereto when the noise is present. Accordingly, the monitoring result obtained through the latch circuit is not affected by the noise. This makes highly accurate monitoring of temperature possible.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

<First Embodiment>

Figure 4:
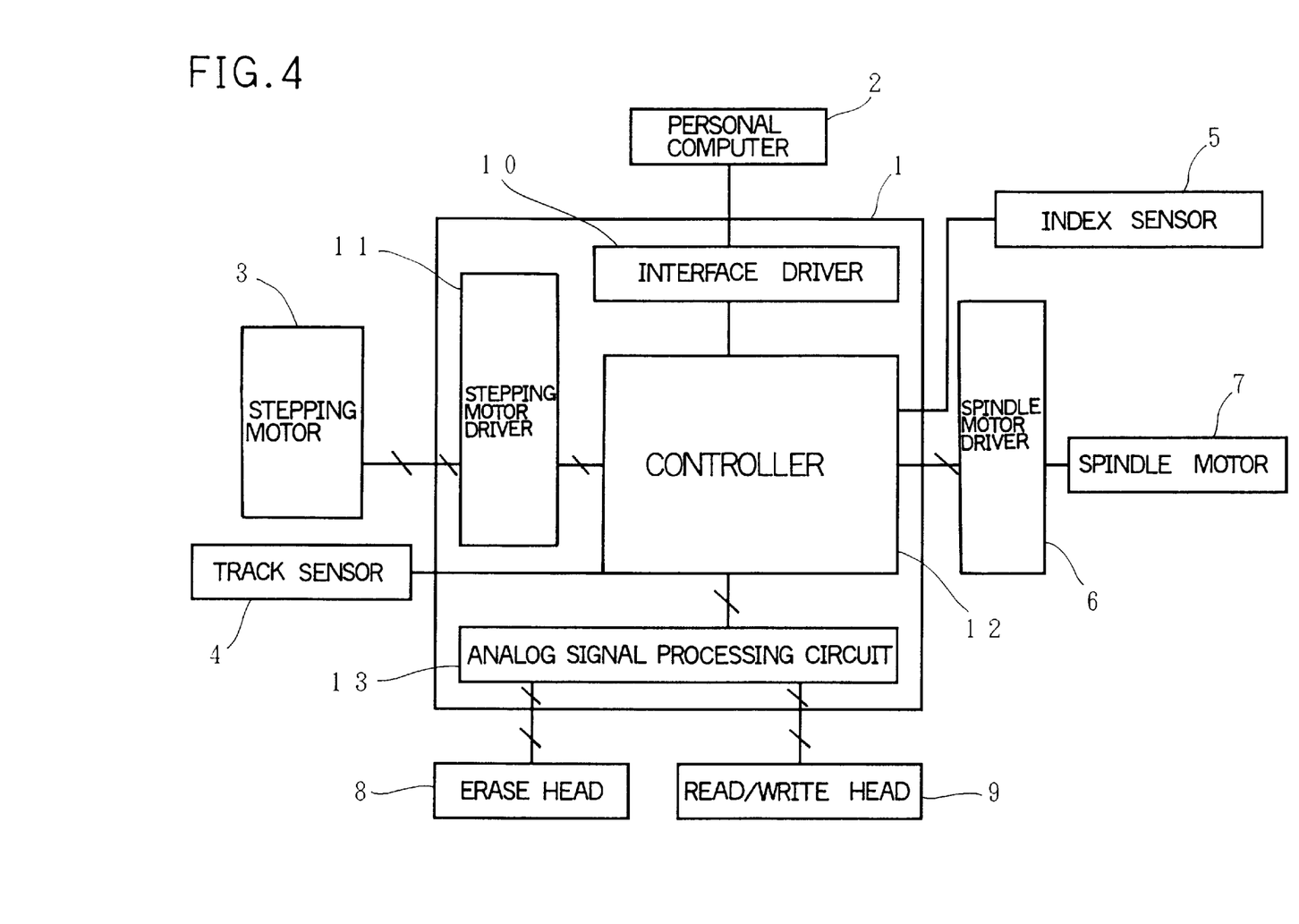
FIG. 4 is a block diagram of a disk drive apparatus embodying the invention.

Hereinafter, embodiments of the present invention will be described with reference to the accompanying drawings. FIG. 4 shows a block diagram of the floppy disk drive apparatus common to a first and a second embodiment of the invention. An LSI 1 includes an interface driver 10 for communicating data with a personal computer 2, a stepping motor driver 11 for driving a stepping motor 3, an analog signal processing circuit 13, and a controller 12 for controlling these circuits. The stepping motor driver 11 handles a large current.

In the LSI 1, the interface driver 10 communicates data with the personal computer 2, which serves as a host to the floppy disk drive apparatus. The controller 12 performs various control operations. The analog signal processing circuit 13 processes analog signals communicated to write and read data to and from a floppy disk (not shown).

A read/write head 9 writes and reads data to and from the floppy disk. An erase head 8 erases the unnecessary remainder of the data left on the floppy disk when the read/write head 9 writes data to the floppy disk because of a slight deviation of the tracking position of the read/write head 9. A track sensor 4 is mechanically activated when the erase head 8 and the read/write head 9 are positioned at track 0 (zero) so that that position is recognized as the reference position for the erase head 8 and the read/write head 9.

An index sensor 5 is activated every time the disk makes one complete turn. This enables the controller 12 to check the presence/absence of the disk. A spindle motor 7 for rotating the disk is driven by a spindle motor driver 6, which in turn is controlled by the controller 12.

Figure 5:
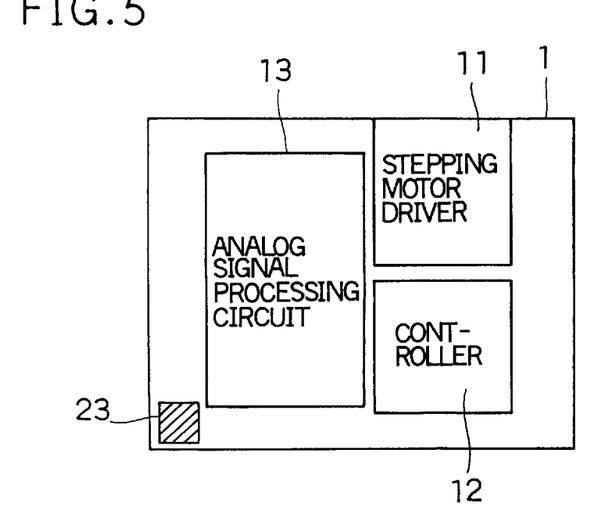
FIG. 5 is a diagram showing the arrangement of various circuits in the semiconductor integrated circuit device of a first embodiment of the invention, as used in the disk drive apparatus shown in FIG. 4.

FIG. 5 shows the arrangement of various circuits in the LSI 1 of the first embodiment. The stepping motor driver 11 is arranged with one side thereof aligned with one side of the LSI 1. The controller 12 is arranged next to the stepping motor driver 11. The analog signal processing circuit 13 is arranged next to both the stepping motor driver 11 and the controller 12.

Figure 6:
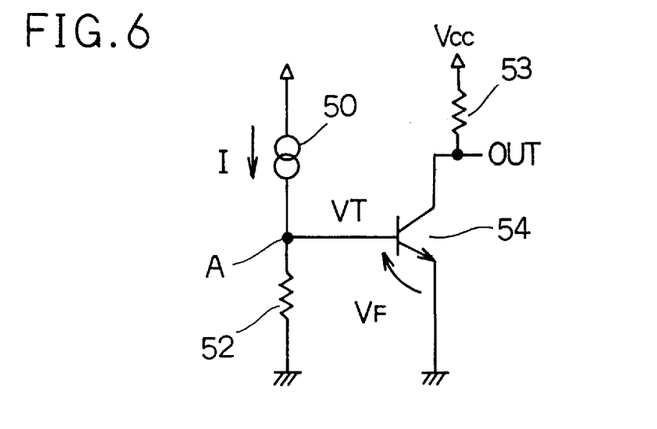
FIG. 6 is a circuit diagram of the temperature monitoring circuit included in the semiconductor integrated circuit device of the first embodiment.

In addition, a thermal shutdown circuit 23 is arranged in the corner opposite to the corner where the stepping motor driver 11 is arranged. Thus, the analog signal processing circuit 13 is arranged between the thermal shutdown circuit 23 and the stepping motor driver 11. The thermal shutdown circuit 23 has a temperature monitoring circuit as shown in FIG. 6 so that it can forcibly turn off the stepping motor driver 11 when the monitoring result of the temperature monitoring circuit indicates that the temperature of the LSI 1 has exceeded a predetermined temperature.

As shown in FIG. 5, the thermal shutdown circuit 23 is arranged a predetermined distance far away from the stepping motor driver 11, and the analog signal processing circuit 13 is arranged between them. In addition, the thermal shutdown circuit 23 and the analog signal processing circuit 13 use a ground line separate from that for the stepping motor driver 11. This almost eliminates the effect of the noise caused by the on/off operation of the stepping motor driver 11 on the thermal shutdown circuit 23, and thereby minimizes the degradation of the operation accuracy of the thermal shutdown circuit 23. Note that, when the stepping motor driver 11 is being turned on or off, the analog signal processing circuit 13 remains inactive; this makes it possible to arrange the stepping motor driver 11 and the analog signal processing circuit 13 next to each other without any problem.

Now, the temperature monitoring circuit included in the thermal shutdown circuit 23 will be described with reference to FIG. 6. A constant current circuit 50 feeds a constant current I to a node A. From the node A, the constant current I flows through a resistor 52 to ground. The voltage VT at the node A is kept at approximately 0.5 V at normal temperature. The node A is connected to the base of an npn-transistor 54 whose emitter is grounded and whose collector is connected through a resistor 53 to a supply voltage $V_{cc}$. Thus, the voltage signal OUT that indicates the result of temperature monitoring is obtained from the collector of the transistor 54.

Despite slight variation with temperature in the resistance of the resistor 52 and in other circuit constants, the voltage at the node A remains substantially constant even when the temperature of the LSI 1 rises. The npn-type transistor 54 is a switching transistor, and its base-emitter threshold voltage, which divides the on and off states of the transistor 54, equals approximately 0.7 V at normal temperature. When the transistor 54 receives a voltage higher than this threshold voltage between its base and emitter, it is turned on.

At normal temperature, the voltage VT at the node A is kept at approximately 0.5 V. Thus, the transistor 54 remains off, and the signal OUT is kept at a high level. As the temperature of the LSI 1 rises, the threshold voltage VF drops. When the threshold voltage VF drops below the voltage VT at the node A, the transistor 54 is turned on, and the signal OUT turns to a low level.

The temperature monitoring circuit monitors the temperature of the LSI 1 as described above. Accordingly, the temperature monitoring circuit is so configured that the signal OUT is kept at a high level at normal temperature and turns to a low level when the temperature becomes higher than, for example, 150° C. When the signal OUT output from the temperature monitoring circuit turns to a low level, the thermal shutdown circuit 23 (see FIG. 5) turns off the stepping motor driver 11.

Figure 7:
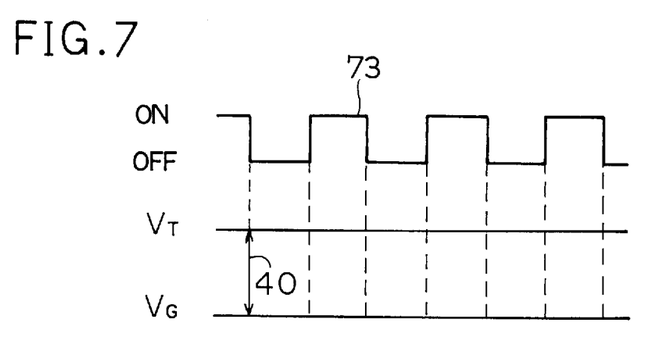
FIG. 7 is a waveform diagram illustrating the operation of the temperature monitoring circuit shown in FIG. 6.

As indicated by the waveform 73 shown in FIG. 7, even when the stepping motor driver 11 is turned on or off, almost no noise appears either in the reference voltage VT that is used by the thermal shutdown circuit 23 to determine the predetermined temperature nor in the ground level VG of the thermal shutdown circuit 23. This is because the thermal shutdown circuit 23 is arranged a predetermined distance far away from the stepping motor driver 11, and the thermal shutdown circuit 23 uses a separate ground line from that for the stepping motor driver 11. As a result, even when the stepping motor driver 11 is turned on or off, the reference voltage VT is kept constant stably as indicated by the arrow 40 in FIG. 7, and thus the monitoring of temperature is not affected by the noise caused by a back electromotive force.

As described above, in the LSI 1, designed for use in a floppy disk drive apparatus, of this embodiment, the thermal shutdown circuit 23 is arranged a predetermined distance far away from the stepping motor driver 11, with the analog signal processing circuit 13 arranged between them. This almost eliminates the effect of the onloff operation of the stepping motor driver 11 on the temperature monitoring by the thermal shutdown circuit 23, and thereby makes highly accurate and stable monitoring of temperature possible. In addition, the thermal shutdown circuit 23 is arranged in a corner of the LSI 1. This makes effective use of the surface of the LSI 1 possible, and thus helps reduce the chip area.

<Second Embodiment>

Figure 8:
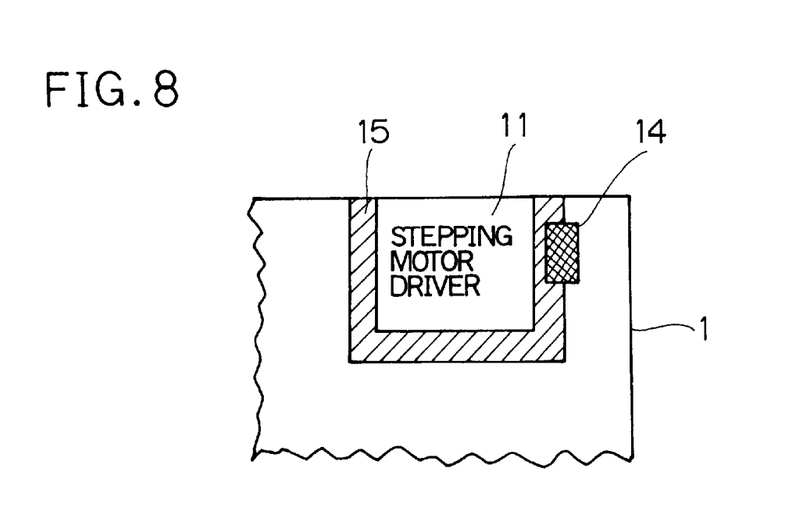
FIG. 8 is a diagram showing the arrangement of various circuits in the semiconductor integrated circuit device of a second embodiment of the invention.

Next, a second embodiment of the invention will be described. The floppy disk drive apparatus of this embodiment has the same configuration as described already and shown in FIG. 4. FIG. 8 shows a part of the LSI 1, designed for use in a disk drive apparatus, of the second embodiment; more specifically, FIG. 8 shows an example of the arrangement of circuits around the stepping motor driver 11. The stepping motor driver 11 is arranged with one side thereof aligned with one side of the LSI 1, and performs on/off operations. The stepping motor driver 11 has an inhibited region 15 secured around it so as not to be affected by noise. In this embodiment, as will be described later, the thermal shutdown circuit 14 is so configured as to be hardly susceptible to noise, and therefore it is possible to place part or the whole of the thermal shutdown circuit 14 within the inhibited region 15.

The thermal shutdown circuit 14 has a temperature monitoring circuit including a circuit that continuously monitors temperature and a latch circuit that latches the output thereof. An example of the circuit that continuously monitors temperature is shown in FIG. 6 and has already been described. The thermal shutdown circuit 14 forcibly turns off the stepping motor driver 11 when the temperature of the LSI 1 exceeds a predetermined temperature of, for example, 150° C.

In this way, the temperature monitoring circuit has a circuit that continuously monitors temperature and is so configured that its output signal KS is kept at a high level at normal temperature and turns to a low level when the temperature of the LSI 1 exceeds the predetermined temperature of, for example, 150° C. However, the signal KS, if directly used, is affected by the variation of the ground level caused by the on/off operation of the stepping motor driver 11.

Figure 9:
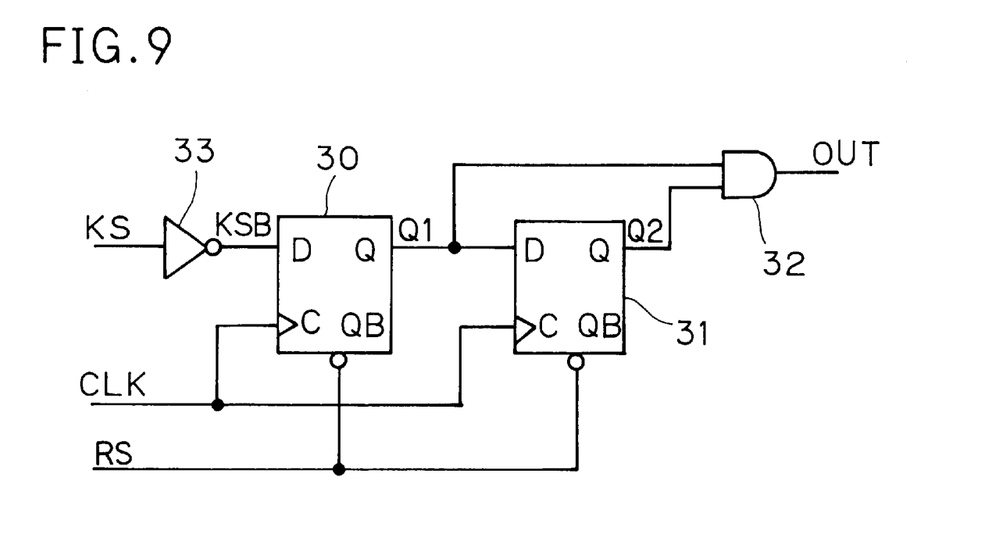
FIG. 9 is a circuit diagram of the latch circuit employed in the thermal shutdown circuit included in the semiconductor integrated circuit device of the second embodiment.

To avoid this, the signal KS is, before being used as a signal representing the temperature monitoring result, passed through a latch circuit as shown in FIG. 9 to reduce the effect of noise. In this embodiment, the latch circuit is composed of a shift register consisting of two D flip-flops 30 and 31, and an AND circuit that takes the logical product of the output signals Q1 and Q2 of those shift registers.

The signal KS is first inverted by an inverter 33 to become a signal KSB, and is then fed to the D input terminal of the D flip-flop 30. The D flip-flop 30 receives, at its C input terminal, clock pulses CLK that are generated by an oscillation circuit (not shown) in such a way that their rising edges occur out of synchronism with the on/off operation of the stepping motor driver 11. The D flip-flop 30 is reset by a reset signal RS. The D flip-flop 30 outputs its output signal Q1 at its Q output terminal.

Next, the signal Q1 is fed to the D input terminal of the D flip-flop 31. The D flip-flop 31 receives, at its C input terminal, the clock pulses CLK. The D flip-flop 31 is reset by the reset signal RS. The D flip-flop 31 outputs its output signal Q2 at its Q output terminal.

In this way, the D flip-flops 30 and 31 constitute a shift register. The AND circuit 32 takes the logical product of the signals Q1 and Q2, and the resulting signal is used as the output signal OUT of the temperature monitoring circuit. When the temperature monitoring circuit starts monitoring temperature, the D flip-flops 30 and 31 are reset by the reset signal.

Figure 10:
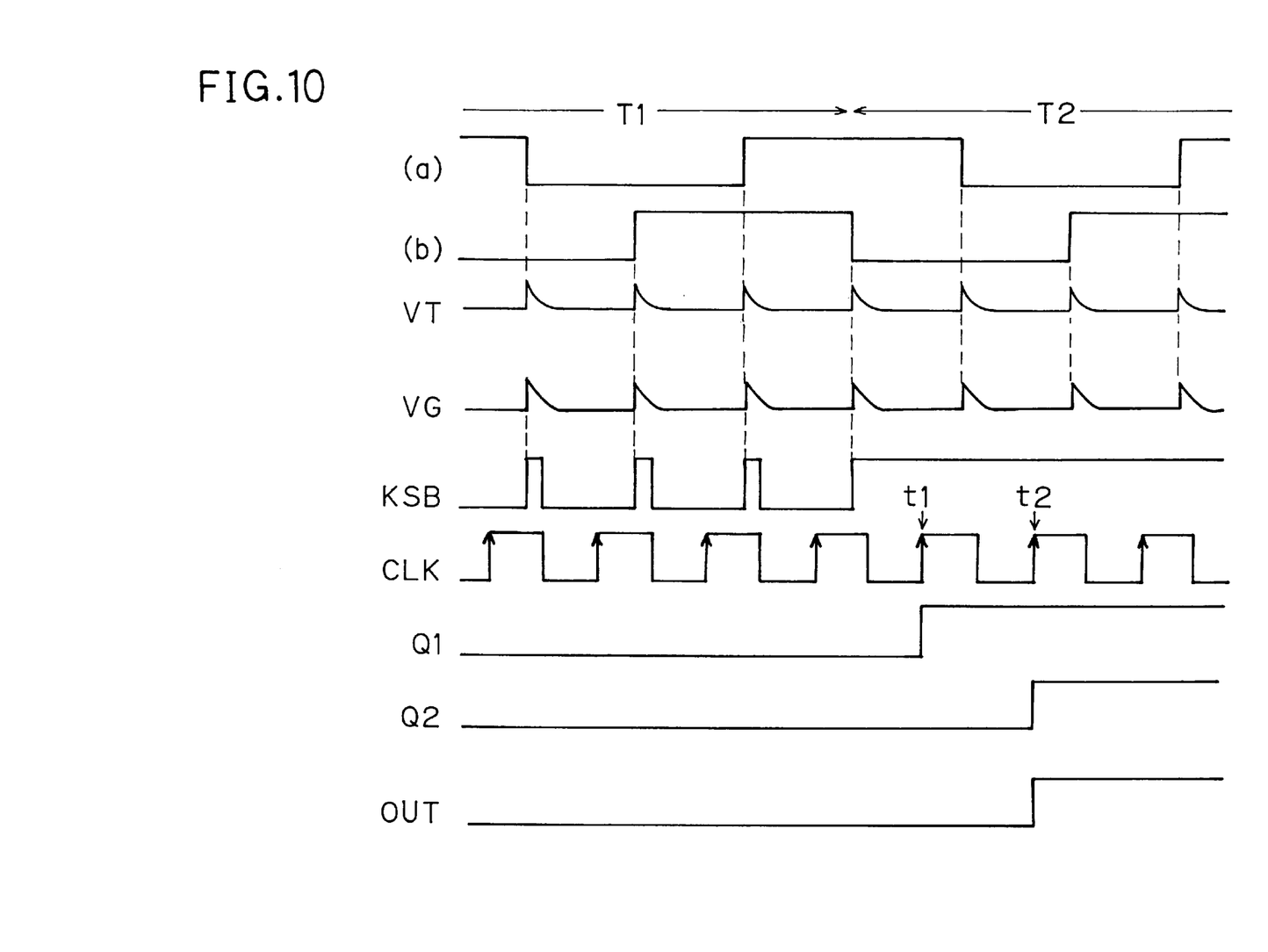
FIG. 10 is a waveform diagram illustrating the operation of the semiconductor integrated circuit device of the second embodiment.

FIG. 10 is a waveform diagram illustrating the operation of the temperature monitoring circuit. The waveforms at (a) and (b) show the timing with which the stepping motor driver 11 (see FIG. 1) is turned on and off. The voltage appearing across the resistor 52 shown in FIG. 6 is kept constant irrespective of the on/off operation of the stepping motor driver 11. Accordingly, when noise is caused in the ground level VG by the on/off operation of the stepping motor driver 11, the voltage of the noise is added to the voltage appearing across the resistor, and thus the reference voltage VT is shifted up accordingly.

This temporarily holds the signal KS, which represents the monitoring result, at a low level. Accordingly, during the time period T1, pulses are output also from the inverter 33. During the subsequent time period T2, a rise in the temperature of the LSI 1 turns the signal KSB to a high level. The clock pulses CLK are fed to the temperature monitoring circuit in such a way that their rising edges cause the signal KSB to be latched out of synchronism with the on/off operation of the stepping motor driver 11. This prevents the thermal shutdown circuit 14 from being affected by the noise caused by the on/off operation of the stepping motor driver 11.

The D flip-flop 30 latches the signal KSB at the rising edge of a clock pulse CLK. Accordingly, at the time point t1 when a clock pulse CLK rises for the first time within the time period t2, the signal Q1 turns from a low level to a high level. Then, at the time point t2 when a clock pulse CLK rises next time, the signal Q2 turns from a low level to a high level. When the signals Q1 and Q2 are both at a high level, the signal OUT is at a high level.

Consequently, even if noise or the like happens to cause the signal Q1 to turn to a high level once at the rising edge of a clock pulse CLK, the signal OUT does not turn to a high level unless the signal Q1 turns to a high level two or more times consecutively. By providing the shift register with more than two latching stages, it is possible to further reduce the possibility of malfunctioning due to noise.

When the signal OUT output from the temperature monitoring circuit turns to a high level, the thermal shutdown circuit 14 (see FIG. 8) forcibly turns off the stepping motor driver 11 to stop heat generation therein. In the example of operation shown in FIG. 10, the clock pulses CLK are fed to the D flip-flops 30 and 31 in such a way that they operate at the mid points between the time points at which the stepping motor driver 11 is turned on and off. However, by adjusting the phase of the clock pulses CLK in such a way that latching operations take place immediately before the stepping motor driver 11 is turned on or off, it is possible to further reduce the effect of the noise caused by a back electromotive force, and thereby make highly accurate monitoring of temperature possible.

As described above, in this embodiment, the thermal shutdown circuit 14 has a temperature monitoring circuit that includes a latch circuit (FIG. 9), and this latch circuit performs its latching operation out of synchronism with the on/off operation of the stepping motor driver 11. Accordingly, the thermal shutdown circuit 14 is hardly affected by the noise caused by the on/off operation of the stepping motor driver 11. As a result, as shown in FIG. 8, it is possible to arrange the thermal shutdown circuit 14 and the stepping motor driver 11 next to each other. This makes it possible to reduce the chip area of the LSI 1. Note that, to reduce power consumption, it is also possible to deactivate the temperature monitoring circuit by deactivating the constant current circuit 50 when a predetermined length of time has elapsed after the start of its operation, when the stepping motor is not driven, or whenever else so desired.

What is claimed is:

1. A semiconductor integrated circuit device comprising:

a motor driver for feeding an electric current to a motor;

a temperature monitoring circuit for monitoring temperature due to heat generated by the motor driver;

a signal processing circuit for processing an analog signal communicated to write or read data to or from a magnetic data recording medium; and a controller for controlling the motor driver and the signal processing circuit, wherein the signal processing circuit is arranged between the motor driver and the temperature monitoring circuit.

2. A semiconductor integrated circuit device as claimed in claim 1, wherein the motor driver is a stepping motor driver for driving a stepping motor.

3. A semiconductor integrated circuit device as claimed in claim 2, wherein the temperature monitoring circuit is arranged in a corner of the semiconductor integrated circuit device.

4. A semiconductor integrated circuit device as claimed in claim 2, wherein the temperature monitoring circuit and the signal processing circuit share a common ground pattern and the stepping motor driver uses a separate ground pattern therefrom.

5. A semiconductor integrated circuit device as claimed in claim 2, further comprising:

a shutdown circuit for turning off the stepping motor driver when the temperature monitored by the temperature monitoring circuit is higher than a predetermined temperature.

6. A disk drive apparatus comprising:

a magnetic head for reading/writing data; a stepping motor for transporting the magnetic head from one track to another; and a semiconductor integrated circuit device, wherein the semiconductor integrated circuit device comprises:

a stepping motor driver for feeding an electric current to the stepping motor;

a temperature monitoring circuit for monitoring temperature of the semiconductor integrated circuit device; and a signal processing circuit for processing an analog signal written or read by the magnetic head, wherein the signal processing circuit is arranged between the temperature monitoring circuit and the stepping motor driver.

7. A semiconductor integrated circuit device comprising:

a motor driver for feeding an electric current to a motor;

temperature monitoring circuit having a circuit that continuously monitors temperature;

a signal processing circuit for processing an analog signal communicated to write or read data to or from a magnetic data recording medium; and a controller for controlling the motor driver and the signal processing circuit, wherein the temperature monitoring circuit has a latch circuit that latches an output of the temperature monitoring circuit out of synchronism with turning on or off of the motor driver.

8. A semiconductor integrated circuit device as claimed in claim 7, wherein the motor driver is a stepping motor driver for driving a stepping motor.

9. A semiconductor integrated circuit device as claimed in claim 8, wherein the stepping motor driver and the temperature monitoring circuit are arranged next to each other.

10. A semiconductor integrated circuit device as claimed in claim 8, wherein the latch circuit has:

a first flip-flop circuit that takes in and holds the output of the temperature monitoring circuit in synchronism with clock pulses generated at regular intervals;

a second flip-flop circuit that takes in and holds an output of the first flip-flop circuit in synchronism with the clock pulses; and an AND circuit that takes a logical product of the output of the first flip-flop circuit and an output of the second flip-flop circuit.

11. A disk drive apparatus comprising:

a magnetic head for reading/writing data;

a stepping motor for transporting the magnetic head from one track to another; and a semiconductor integrated circuit device, wherein the semiconductor integrated circuit device comprises:

a stepping motor driver for feeding an electric current to the stepping motor;

a temperature monitoring circuit for monitoring temperature of the semiconductor integrated circuit device; and a signal processing circuit for processing an analog signal written or read by the magnetic head, wherein the temperature monitoring circuit has a latch circuit that latches an output of the temperature monitoring circuit out of synchronism with turning on or off of the stepping motor driver.

* * * * *